United States Patent
Li et al.

(10) Patent No.: US 11,940,901 B2
(45) Date of Patent: *Mar. 26, 2024

(54) SYSTEM AND METHOD TO USE PAST COMPUTER EXECUTABLE INSTRUCTIONS TO EVALUATE PROPOSED COMPUTER EXECUTABLE INSTRUCTIONS

(71) Applicant: VISA INTERNATIONAL SERVICE ASSOCIATION, San Francisco, CA (US)

(72) Inventors: Yue Li, Foster City, CA (US); Theodore Harris, Foster City, CA (US); Tatiana Korolevskaya, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,579

(22) Filed: Apr. 19, 2022

(65) Prior Publication Data

US 2022/0253373 A1   Aug. 11, 2022

Related U.S. Application Data

(63) Continuation of application No. 16/731,499, filed on Dec. 31, 2019, now Pat. No. 11,321,221.

(51) Int. Cl.
*G06F 11/36* (2006.01)
*G06N 20/00* (2019.01)

(52) U.S. Cl.
CPC ...... *G06F 11/3644* (2013.01); *G06F 11/3688* (2013.01); *G06N 20/00* (2019.01)

(58) Field of Classification Search
CPC .. G06F 11/3644; G06F 11/3688; G06N 20/00
USPC .................................................. 717/124–140
See application file for complete search history.

(56) References Cited

U.S. PATENT DOCUMENTS

| | | | |
|---|---|---|---|
| 5,457,747 A | 10/1995 | Drexler | |
| 6,149,318 A | 11/2000 | Chase | |
| 6,219,805 B1* | 4/2001 | Jones | G06F 11/3616 714/48 |
| 7,093,239 B1 | 8/2006 | van der Made | |
| 7,137,103 B2 | 11/2006 | Aizenbud-Reshef | |
| 7,331,043 B2 | 2/2008 | Saulsbury | |
| 7,549,147 B2 | 6/2009 | Futoransky | |
| 7,818,729 B1 | 10/2010 | Plum | |
| 7,840,844 B2* | 11/2010 | Garland | G06F 11/263 717/124 |

(Continued)

OTHER PUBLICATIONS

Mokhov et al., "MARFCAT: Fast Code Analysis for Defects and Vulnerabilities", IEEE, pp. 35-38 (Year: 2015).*
Orton et al., "Source Code Patches from Dynamic Analysis", ACM, pp. 1-8 (Year: 2021).*
Touili et al., "SMODIC: A Model Checker for Self-modifying Code", ACM, pp. 1-6 (Year: 2022).*

(Continued)

*Primary Examiner* — Anil Khatri
(74) *Attorney, Agent, or Firm* — K&L Gates LLP

(57) ABSTRACT

Computer executable instructions including code sections are received and compared to previously analyzed computer executable instructions. The code sections are then analyzed and assigned a risk score. If the risk score is over a threshold, an alarm may be communicated or the system may substitute computer executable instructions that may have been created according to a standard or have been previously approved.

20 Claims, 8 Drawing Sheets

(56) References Cited

U.S. PATENT DOCUMENTS

| | | | |
|---|---|---|---|
| 8,639,625 B1 | 1/2014 | Ginter | |
| 8,732,838 B2* | 5/2014 | Medvedev | G06F 21/577 |
| | | | 714/741 |
| 8,812,417 B2* | 8/2014 | Martinez | G06N 3/08 |
| | | | 706/21 |
| 8,875,091 B1 | 10/2014 | Rouleau | |
| 9,032,531 B1 | 5/2015 | Scorvo | |
| 9,817,974 B1 | 11/2017 | Huang | |
| 9,946,879 B1* | 4/2018 | Sharifi Mehr | G06F 21/577 |
| 9,959,198 B1* | 5/2018 | Jha | G06F 11/3684 |
| 10,503,632 B1* | 12/2019 | Sivanantham | G06F 11/3684 |
| 10,503,822 B1 | 12/2019 | Spencer | |
| 10,853,231 B2* | 12/2020 | Guenther | G06F 11/3688 |
| 11,093,378 B2* | 8/2021 | Balasubramanian | G06F 9/546 |
| 11,232,383 B1* | 1/2022 | Burns, Sr. | G06Q 10/0637 |
| 11,321,221 B2 | 5/2022 | Li | |
| 11,556,815 B1* | 1/2023 | Stave | G06N 20/20 |
| 11,562,349 B2* | 1/2023 | McCauley | G06Q 20/3278 |
| 11,656,978 B1* | 5/2023 | Konrardy | G08G 1/205 |
| | | | 703/22 |
| 2011/0314450 A1 | 12/2011 | Shochat | |
| 2013/0124927 A1 | 5/2013 | Balko | |
| 2018/0121657 A1 | 5/2018 | Hay | |
| 2019/0205542 A1* | 7/2019 | Kao | G06F 8/10 |
| 2021/0200662 A1 | 7/2021 | Li | |

OTHER PUBLICATIONS

Smith et al., "Verifying data refinements using a model checker", Formal Aspects of Computing, pp. 264-287 (Year: 2006).*
Ismail et al., "A Review on BIM-Based Automated Code Compliance Checking System", IEEE, pp. 1-6 (Year: 2017).*
Haider et al., "Risk Factors and Practices for the Development of Open Source Software From Developers' Perspective", IEEE, pp. 63333-63350 (Year: 2023).*
Hassan et al., "Architectural-Level Risk Analysis Using UML", IEEE, pp. 946-959 (Year: 2003).
Meneely et al., "An Empirical Investigation of Socio-technical Code Review Metrics and Security Vulnerabilities", ACM, pp. 37-44 ( Year: 2014).
Neumann, "An Enhanced Neural Network Technique for Software Risk Analysis", IEEE, pp. 904-912 (Year: 2002).
Office Action (Notice of Allowance and Fees Due (PTOL-85)) dated Jan. 24, 2022 for U.S. Appl. No. 16/731,499 (pp. 1-16).
Office Action dated Mar. 19, 2021 for U.S. Appl. No. 16/731,499 (pp. 1-4).
Spadini et al."On The Relation of Test Smells to Software Code Quality", IEEE, pp. 1-12 (Year: 2018).
Wedel et al., "Mining Software Code Repositories and Bug Databases using Survival Analysis Models", ACM, pp. 282-284 (Year: 2008).

* cited by examiner

SYSTEM AND METHOD TO USE PAST COMPUTER EXECUTABLE INSTRUCTIONS TO EVALUATE PROPOSED COMPUTER EXECUTABLE INSTRUCTIONS

CROSS-REFERENCE TO RELATED APPLICATIONS

This application is a continuation application of U.S. application Ser. No. 16/731,499, filed Dec. 31, 2019, entitled "SYSTEM AND METHOD TO USE PAST COMPUTER EXECUTABLE INSTRUCTIONS TO EVALUATE PROPOSED COMPUTER EXECUTABLE INSTRUCTIONS". The disclosure of the application referenced above is incorporated by reference herein its entirety.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

The amount of computer executable instructions that exist is almost incalculably large already and growing quickly. So many computer executable instructions make it hard to verify that all computer executable instructions are not risky or flat out malicious. At the same time, new and improved computer executable instructions are the driver behind many modern miracles, from medical devices to programmable lawn mowers. The challenge to review computer executable instructions continues to grow and the complexity of the problem and possible permutations is a vexing problem as computer executable instructions continue to enable more and more devices.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Computer executable instructions are received and compared to previously analyzed computer executable instructions. If a comparison cannot be completed, the computer executable instructions may be further broken down into small code sections until all the sections are known or separated into an unknown batch. The code sections are then analyzed and assigned a risk score. If the risk score is over a threshold, an alarm may be communicated or the system may substitute computer executable instructions that may have been created according to a standard or have been previously approved.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1:
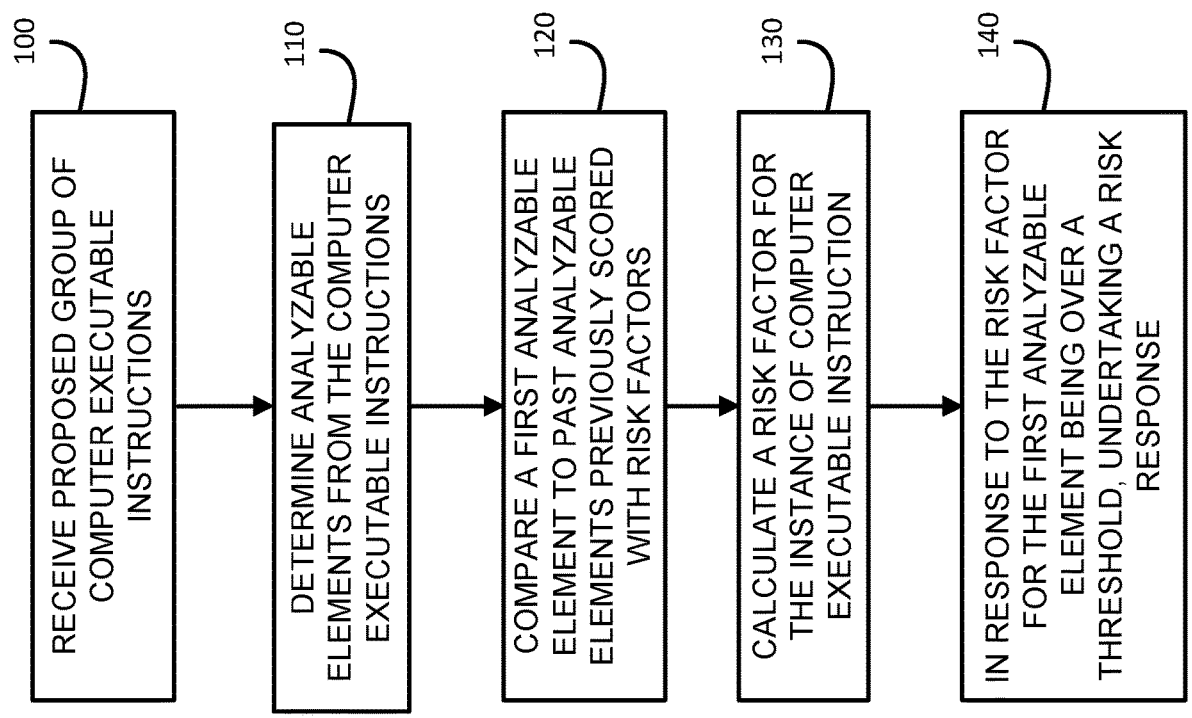
FIG. 1 may be a method performed by the processor.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

SPECIFICATION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

At a high level, computer systems use computer executable instructions to physically configure one or more processors according to the computer executable instructions. The processors then can receive executable instructions input such as data and operate using the data to make decisions. The instructions can be quite complex and in some instances, the instructions may be malicious. Malicious code may take on a variety of forms and may be intentionally disguised to avoid detection making finding malicious code difficult.

The present invention may attempt to use past computer instructions that have been analyzed previously to review proposed computer executable instructions. Past computer executable instructions may be classified as malicious or risky or instructions with minimal risks. Suspect code may be detected by looking at how well the proposed code aligns with prior cleared code samples verse how well aligned it is to known malicious code. Even if a computer executable instructions does not align with known malicious code it may still be flagged as suspicious if it fails to align with known good code. Even code that does not follow accepted standards may be noted and may be corrected to follow the standards.

tions in the same language. For example, computer executable instruction that are in Python may be easier compared to previous sections written in Python. In some embodiments, the computer executable instructions may be broken down into a lower level language such as assembler to make the analysis more efficient and require less conversion between computer programming languages. In one embodiment, the lower level language is an instruction set defined in XML or JSON Markup language. Example:

```
The following SQL:
    myInputA = load("[[0, 1],[0, 2],[1, 1]
        ,[1, 2],[1, 3],[1, 4],[2, 1]
        ,[2, 2],[3, 1],[3, 2]]"
        , "readarray"
        , {'id':(0, 0, 'int'),'val':(1, 0, 'int')});
    myout = return(stdout);
    SELECT
        id,
        val,
        -1 AS tmp,
        CASE
            WHEN id == 1 THEN 1,
            ELSE id == 2 then 2,
            ELSE id == 3 then 3,
            ELSE id == 0 then 0,
        END AS tmp
        INTO myout
        FROM myInputA
            BY id
    RUN;
And following Python:
from vei.api.functions import Functions
from vei.api.processers import Processers
from vei.api.data import Data
from vei.api.lookups import Lookups
data = Data.DataSet( )
functs = Functions( )
processers = Processers( )
lookups = LookUps( )
myInputA = data.load("[[0, 1],[0, 2],[1, 1] ,[1, 2],[1, 3],[1, 4],[2, 1] ,[2, 2],[3, 1],[3, 2]]" , "readarray" , {'id':(0, 0, 'int'), 'val':(1, 0, 'int')})
    myout = data.output("stdout")
for key, row in data.by(myInputA,"id"):
    myout.set_history(key)
    myout.id=row.id
    myout.val=row.val
    myout.tmp = -1
    if myout.id == 1 :
        myout.tmp = 1
    elif myout.id == 2 :
        myout.tmp = 2
    elif myout.id == 3 :
        myout.tmp = 3
    elif myout.id == 0 :
        myout.tmp = 0
    myout.write( )
compile to:
xml>
```

FIG. 1 may illustrate a sample method implemented by a computer system to analyze proposed or existing computer executable instructions for risk.

At block 100, proposed group of computer executable instructions may be received. The computer executable instructions may be a large file or may be a small piece of computer code. Logically, if the large file matches a previous file, the analysis may proceed more quickly. However, the large file will likely have many lines of code and related commands that may need to be analyzed.

The instructions may be in virtually any computer language. The comparison may be easier by comparing instructions in the same language. For example, computer executable instruction that are in Python may be easier compared to previous sections written in Python.

A risk factor for the computer executable instructions may be determined. At a high level, the risk factor may be determined by examining a variety of factors related to the computer executable instruction and determining if those factors are similar to factors previously reviewed and graded based on risk. The factors may be summed or averaged or analyzed to determine the risk factor.

At block 110, analyzable elements from the computer executable instructions may be determined. Determining analyzable elements make take on a variety of forms and a variety of computing blocks. It may be possible that an entire computer executable instruction set may be a copy of a previously set of computer executable instructions which may be one large analyzable element. While unlikely, the comparison may be quick in such a case as the comparison has been run before and the results have been stored in the database to improve results into the future.

More likely, some sections of the computer executable instruction may be recognized and some sections may not be recognized. The sections that are recognized may be separated and analyzed to make sure there are no changes between the recognized computer executable instruction and the proposed computer executable instruction as even small changes may have a large impact on the safety of a computer executable instruction set. The proposed computer executable instruction may continue to be broken down until all the instructions have been matched with previously analyzed computer executable instruction.

Logically, some computer executable instruction statements may be a single word or some words may not be matched at all, such as a variable name. In such cases, the words or phrases before or after the unknown word may be analyzed together. For example, in the following command, Scorpio may be a variable name and may not be known in previous approved computer executable instruction:

10 Get Scorpio;

However, the command Get may be known and the system and method may be able to determine that Scorpio, the word that follows Get, may logically be a variable name. In some instances, the variable may have been declared earlier in the computer executable instruction. In other instances, the rest of the computer executable instruction may be reviewed to obtain additional information about the computer executable instruction.

At block 120, a comparison of a first analyzable element may be compared to past analyzable elements previously scored with risk factors. For example, a get command for a known variable may have been previously scored as a low risk factor. Similarly, a command to get or load in computer executable instruction from a fraudulent network location may have been previously scored as a high risk factor. Logically, the first analyzable element and the risk factor for the first analyzable element may be added to the memory such that the catalog of previously graded computer executable instruction may grow and improve.

The similarity score may be determined by comparing the proposed computer executable instruction to known computer executable instruction. In one embodiment, the computer executable instruction as a whole are analyzed. As a result of the review, a coding similarity score may be determined. The coding similarity score may indicate how similar the computer executable instruction are to previously reviewed computer executable instruction. For example, if the variable Scorpio could not be verified, the coding similarity score may fall. Similarly, if the code is not a perfect match to known code and logical reasoning may be used, the similarity score may be lower. In contrast, if key elements of the computer executable instruction are recognized and trusted, the score may be higher.

As mentioned previously, classifying the computer executable instructions may include comparing the computer executable instructions to previously classified computer executable instructions and determining a similarity value between the computer executable instructions and previously classified computer executable instructions. The similarity value may be stored in a memory. In response to the similarity value for the previously classified computer executable instructions being over a threshold, the computer executable instructions may be classified with a similar score as the previously classified computer executable instructions.

In one embodiment, the computer executable instructions may be reviewed for a coding style, and a coding style similarity score may be determined. In yet another embodiment, the style of the computer executable instructions may be reviewed and the style may be an element of the rating. The style may be based on a variety of factors. In some embodiments, the style may be determined by looking at the comments in the computer executable instruction. In other embodiments, the style of the computer executable instruction may look at the libraries used. In other embodiments, the style may look at how the code is indented. The following is example metadata derived from a script:

```
Python Script:
from vei.api.functions import Functions
from vei.api.processors import Processors
from vei.api.data import Data
from vei.api.lookups import Lookups
data = Data.DataSet( )
functs = Functions( )
processers = Processers( )
lookups = LookUps( )
in = data.load("./test_framework/pmml/data/USCensus1990.s2.data", "delim", "header", "csv")
for row in in:
    myOut.dep = 0.0
    myOut.dIncome2 = functs.float(row.dIncome2)
    myOut.dIncome3 = functs.float(row.dIncome3)
    if myOut.dIncome2 > 0 :
        myOut.dep =1.0
    if myOut.dIncome3 > 0 :
        myOut.dep =1.0
    myOut.dep = functs.float(myOut.dep)
    myOut.iMarital = functs.float(row.iMarital)
    myOut.iFertil = functs.float(row.iFertil)
    myOut.dHispanic = functs.float(row.dHispanic)
    myOut.iSex = functs.float(row.iSex)
    myOut.iSchool = functs.float(row.iSchool)
    myOut.iDisabl1 = functs.float(row.iDisabl1)
    myOut.dAge = functs.float(row.dAge)
    myOut.write( )
```

-continued

```
processers.logistic(data = myOut,
   target=dep,
   features=["iMarital","iFertil","dHispanic","iSex","iSchool","iDisabl1","dAge"],
   model_name='USCensus_logistic',
   model_version='1',
   export='./test_framework/pmml/models',
)
METADATA:
('1 ', 'Extra blank line. ')
('21 ', 'Extra blank line. ')
('10 ', 'Missing spaces around equal.')
('3 ', 'Incorrect indentation.')
(' ', 'Variable never used ', 'logistic_target.dep ', ' ')
(' ', 'Variable never used ', 'logistic_features.imarital ',' ')
```

In yet another embodiment, the style may represent the use of sub-routines. In yet another embodiment, the style may relate to the commands used and the commands not used. Logically, the style may be a combination of all these elements. If the style of the code section is similar to a previously determined safe programing style, the risk factor may be lower and if the programming style is similar to previously determined risky programming style, the computer executable instruction may be determined to have a higher risk.

Referring again to block 130, a risk factor for the instance of computer executable instruction may be determined. The risk factor may be determined in a variety of ways. In some embodiments, if all the computer executable instruction have high or perfect similarity scores to previously acceptable computer executable instruction, the risk factor may be low. On the other hand, if the computer executable instruction does not have good similarity scores, or the scores indicate a similarity to risky computer executable instruction, the risk factor may be high.

In addition how the code executes is analyzed using profiling tools. The following output is for the previous Python examples above:

| Internal Functions Name | Count | Total Time | Avg. Time |
|---|---|---|---|
| return_data | 1 | 19.382915 | 19.382915 |
| run | 3 | 19.382847 | 6.460949 |
| set_output | 4 | 19.381427 | 4.845357 |
| process_agg_keys | 2 | 19.31373 | 9.656865 |
| read_dict_input | 200002 | 9.068151 | 4.5e−05 |
| process_0_keys | 100001 | 8.896003 | 8.9e−05 |
| run_steps_no_hist | 100000 | 7.257707 | 7.3e−05 |
| train | 1 | 6.523637 | 6.523637 |
| classify | 1000000 | 2.946698 | 3e−06 |
| set_history_batch_no_date | 200000 | 1.00847 | 5e−06 |
| append_loop_data | 99999 | 0.49698 | 5e−06 |
| set_current_step | 1306097 | 0.389196 | 0.0 |
| create_loop_data | 100001 | 0.291441 | 3e−06 |
| set_loop_data | 100001 | 0.095616 | 1e−06 |
| return_output | 100000 | 0.047136 | 0.0 |
| create_log_file | 1 | 0.00928 | 0.00928 |
| load_file | 1 | 0.001379 | 0.001379 |
| init_loop | 2 | 5.2e−05 | 2.6e−05 |
| set_lookups | 2 | 3.5e−05 | 1.7e−05 |
| set_lookups | 40 | 2.6e−05 | 1e−06 |
| set_lookups | 2 | 1.2e−05 | 6e−06 |
| return_output_agg_tuple | 2 | 1.1e−05 | 5e−06 |
| finalize_output | 1 | 7e−06 | 7e−06 |
| process | 2 | 4e−06 | 2e−06 |
| __init__ | 1 | 2e−06 | 2e−06 |
| return_global_key | 2 | 2e−06 | 1e−06 |
| internal | 1 | 1e−06 | 1e−06 |

If one or more of the internal functions take longer or shorter than usual or would be expected based on past performance or performance in similar environments, an alert or risk score adjustment may be made such that the internal function in question may be further reviewed.

The risk factor may be determined in a variety of ways and make take a variety of computing blocks. In some embodiments, the computer executable instruction itself may be a determining element of the risk factor. In other embodiments, the source of the computer executable instruction may be analyzed and if the source has created risky code in the past, there may be an assumption that the code is risky again.

At block 140 in response to the risk factor calculated for the first analyzable element being over a threshold, a risk response may be executed. The risk response may take on a variety of forms. In one embodiment, the risk response may replace the computer executable instructions identified as risk with a comparable computer executable instructions that have been determined to have an acceptable risk. In another embodiment, the risk response may include communicating a risk warning. The warning may be any communicated message. In some embodiments, it may go to the code draft and in other embodiments, it may go to an authority. In yet another embodiment, a high risk factor may result in a communication and a hold being placed on the computer executable instruction. Logically, the risk response may vary and may be specific to the situation at hand and may be modified by an authority.

The risk threshold may be set in a variety of ways. In some embodiments, a limit may be set by an authority. For example, if the computer executable instruction are to be used by the government on a sensitive project, the threshold may be set high. In the alternative, if the code is to be used at home for fun or for experimentation, the threshold may be lower. Some companies may even demand proof that the proposed computer executable instruction graded over a threshold. In some embodiments, past history may be used as a guide on how to set the risk threshold. For example, if the threshold was lowered and the computer executable instruction which were under the threshold were later found to have security risks, the lower threshold may no longer be acceptable and the threshold may need to be raised. Similarly, computer executable instruction that are endlessly rejected and never pass the threshold may indicate that the threshold should be reduced.

Logically, the system and method may continue until all elements of the computer executable instruction have been reviewed. More specifically, a comparison may be executed for additional analyzable elements in the computer executable instructions to past analyzable elements stored in a memory.

Based on the comparisons, a total risk factor may be calculated wherein the total risk factor includes the total of the risk factors for the additional analyzable elements. The total risk factor may take into account the risk for the entire computer executable instruction set. In some embodiments, the total risk factor may be an average of all the risk factors for the computer executable instruction sections analyzed. In other embodiments, only the top score may be review to show the user the highest risks.

Other elements may go into determining the total risk factor. For example, libraries used by the computer executable instructions may be analyzed and an updated total risk factor may be determined where the updated total risk factor includes a total of the risk factors for the additional analyzable elements and the risk factor determined for the libraries. As an example, if a library is used that is old or overbroad for its purpose, using such a library may be a risk. Instead, a newer and more limited library may be used which may be less risky. In response to the updated total risk factor being over a threshold, a risk warning may be communicated.

In yet another embodiment, deviations in the computer executable instructions from model computer executable instructions may be determined. The deviations may be communicated to a user. The user may be allowed to select to modify the deviations to follow the model computer executable instructions and the deviations in the computer executable instructions may be modified to follow the model computer executable instructions.

In yet another embodiment, deviations in the computer executable instructions from model computer executable instructions may be determined. In one embodiment, the computer executable instruction may be modified to be in conformance with the model computer executable instruction. If the deviation is determined to be a threat, the deviations may be communicated to a supervisor and the supervisor may be allowed to select to modify the deviations to follow the model computer executable instructions.

The determinations of the system may be stored in a memory and may be added to the previously analyzed computer executable instruction database. Thus, the analyzed computer executable instruction database will continue to grow and become even more useful in the future.

Trusted outside sources also may be permitted to add the computer executable instruction database. Fraudulent computer executable instruction may be easier to thwart if programmers worked together. In addition, false positives may be reduced if additional sources of analysis are allowed to contribute the computer executable instruction database. The computer executable instruction database may grow faster and have better results as more computer executable instruction are added to the computer executable instruction database.

Further, machine learning algorithms may be executed against the analyzed computer executable instruction database to update model computer executable instruction moving forward. Computer executable instructions are a language and while the language follows a format, it changes over time as coding styles improve and more vulnerabilities are found and corrected.

Figure 2:
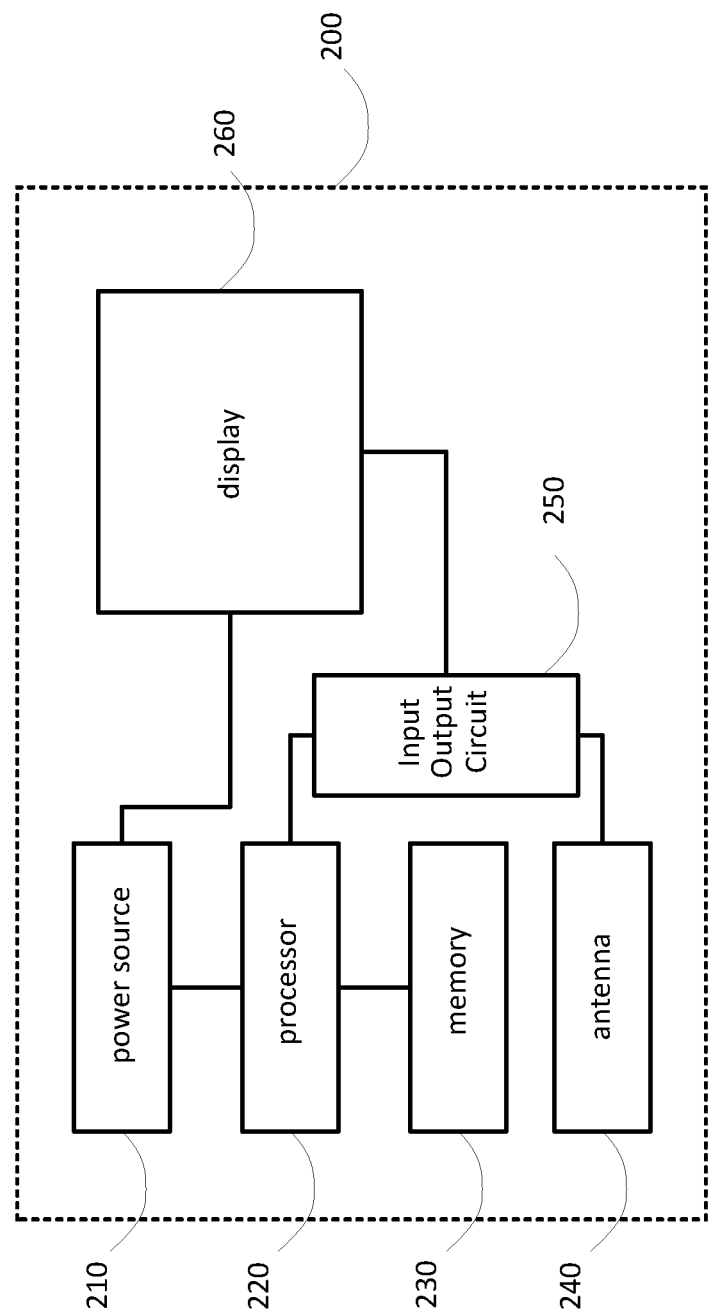
FIG. 2 may be a sample computing system.

As mentioned previously, computer executable instructions may physically transform a processor to execute different tasks. FIG. 2 may illustrate a sample computer system that is configured according to computer executable instructions. The computer 200 may have a power source 210 such as a standard wired electrical power source or a portable power source such as a battery, capacitor or solar cell. The power source 210 may be in communication with a processor 220 that may be physically configured according to the computer executable instructions. The processor 620 may be in communication with one or more memories 230 which may store the computer executable instructions and data that is used by the processor 220. In some instances such as when the computing device 200 is a portable computing device, an antenna 240 may be included. The antenna 240 and processor 220 may be in communication with an input output circuit 250. The input output circuit 250 may direct electronic traffic through the computing device 200. In addition, a display 260 may be in communication with the input output circuit 250 and the power source 210.

Figure 3:
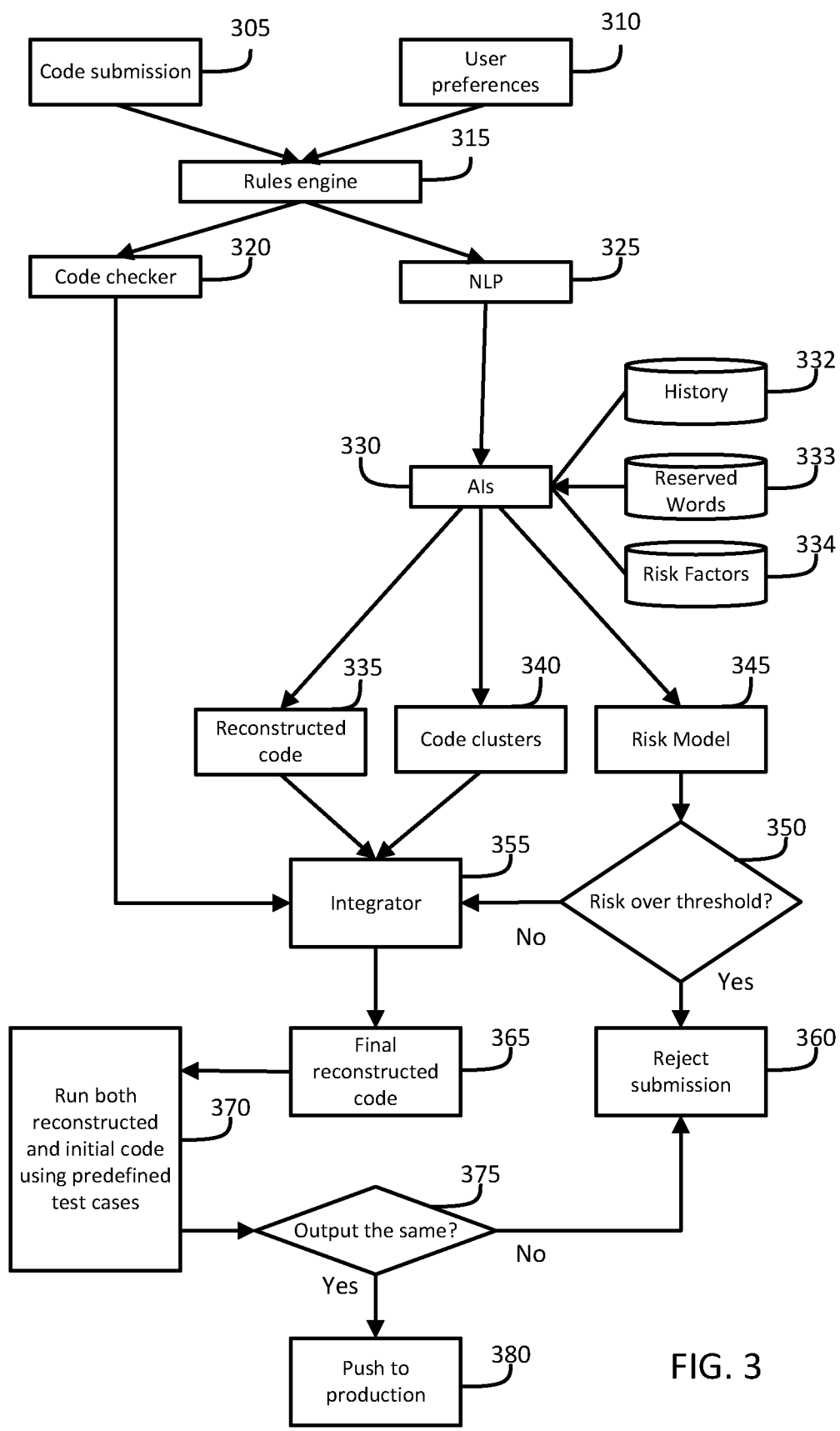
FIG. 3 may be a method performed by the processor.

FIG. 3 may be a more detailed illustration of the operation of the system. At block 305, computer executable instructions and user preferences (at block 310) may be submitted to a rules engine at block 315. As mentioned previously, the computer executable instructions may be an entire application or may be code snippets. User preferences may relate to the level of risk tolerance of the user, for example. For example, government security applications may require extremely low risk tolerance while coding for a home project may tolerate high risk.

The rules engine 315 may undertake an initial review of the computer executable instructions. In some situations, all or part of the computer executable instructions may be copies of computer executable instructions analyzed previously. The rules engine may quit recognize the computer executable instructions that have previously been analyzed to speed the analysis. Other rules may be defined by the user or may be refined over time as the model learns from past computer executable instructions reviews.

Figure 4:
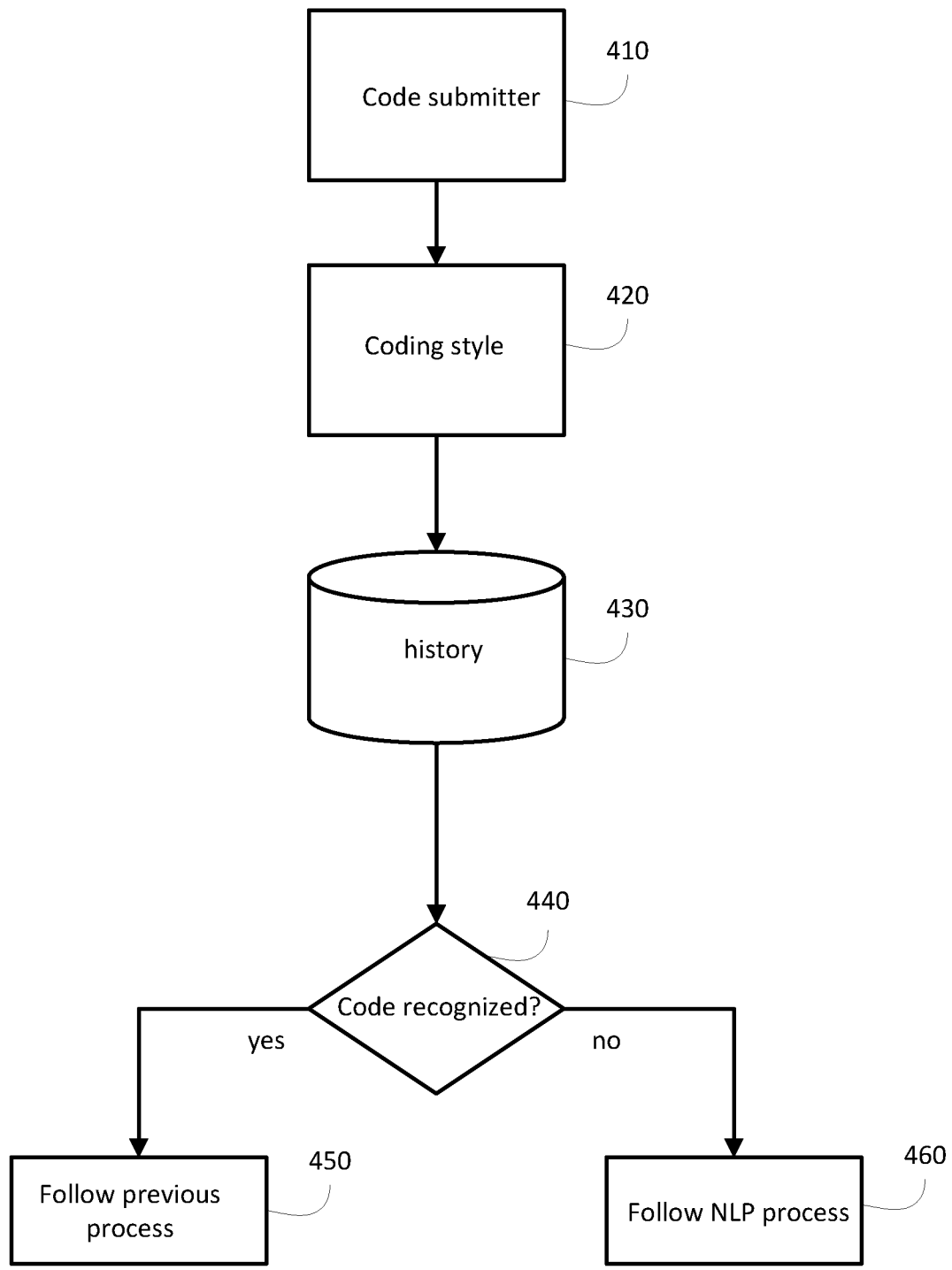
FIG. 4 may be an illustration of a method of analyzing computer executable instructions.

FIG. 4 may illustrate one sample method to review computer executable instructions to history. The code submitter 410, coding style 420 and the history of past reviewed computer executable instructions may be analyzed at block 440. If code submitter/specific team submitter has been seen previously, follow previous processing process of the computer executable instructions 450. For example, if a known and trusted programmer or programming group submits computer executable instructions to be analyzed, the base assumption is that the computer executable instructions may be trusted or at least treated in the same way as computer executable instructions from the programmer or programming team was treated in the past 450. If the computer executable instructions submitter or submitting group is not in the history database, then the computer executable instructions may be analyzed using the natural language processing. Similarly, if the coding style of the computer executable instructions is the database or if the coding style of the computer executable instructions belongs to any code style clusters, computer executable instructions may be treated in the same way as past computer executable instructions with a similar style. If the computer executable instructions are not recognized by the author, the style or the history, the computer executable instructions may be review using the normal process at block 330 (FIG. 3). In some embodiments, a code's style may be determine by scoring it with an unsupervised model built on metadata from prior code bases. One of the code's risk factors may be determine be looking up the prior riskiness of code with a similar style as determined by the unsupervised model.

Figure 5:
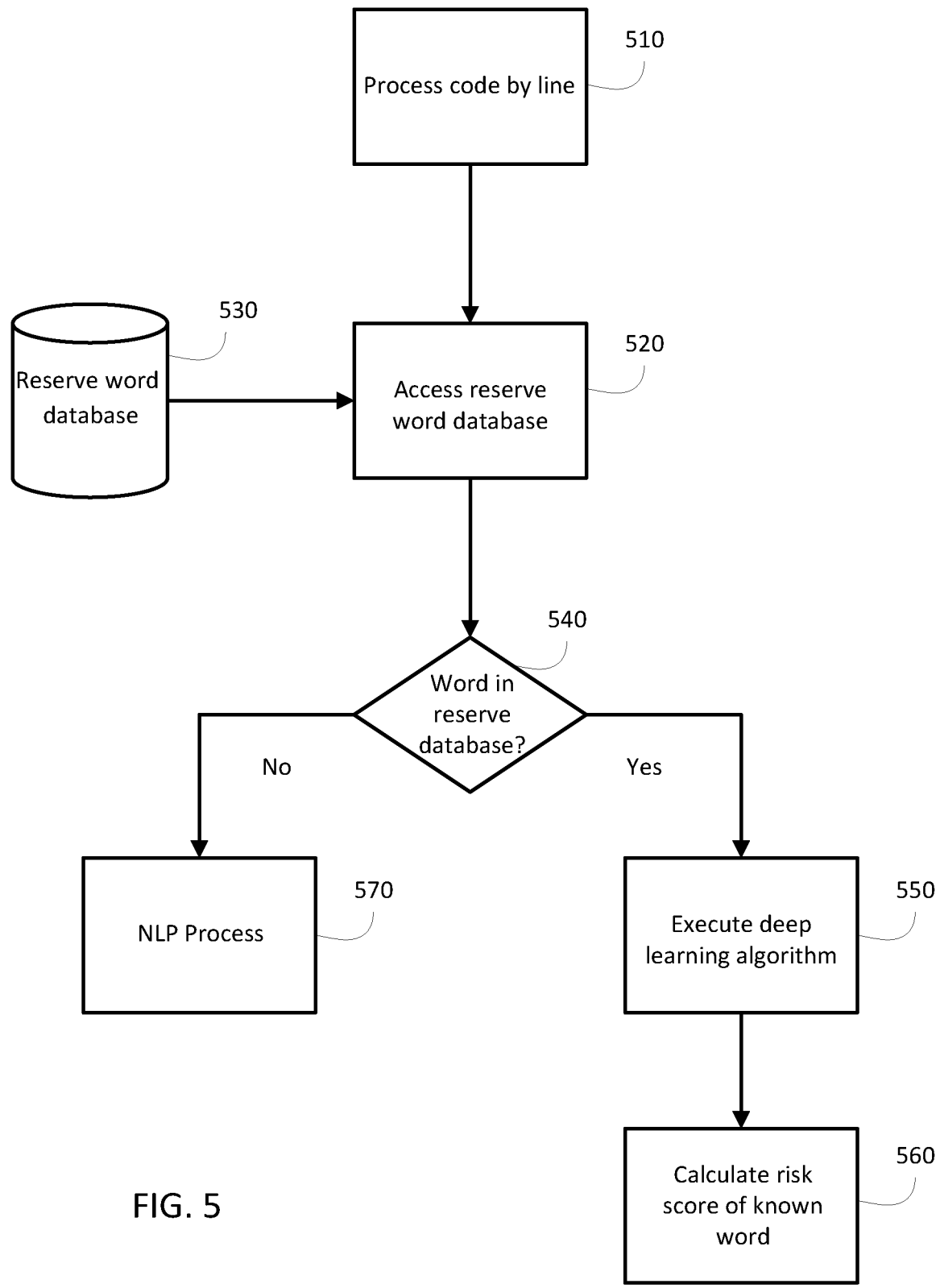
FIG. 5 may be an illustration of analyzing commands in computer executable instructions.

As illustrated in FIG. 5, code may be processed line by line 510. Within each line, each word may be compared with reserved words accessed 520 from a reserve word database 530. At block 540, if a reserved word is found, at block 550, the computer executable instructions may be run through a deep learning algorithm 550 to check the line risk score calculated 560 or associated with the reserved word. Sample deep learning algorithms may include nn, decision tree, etc. If reserved word is not found at block 540, the method may run normal natural language processing process at block 570.

Figure 6:
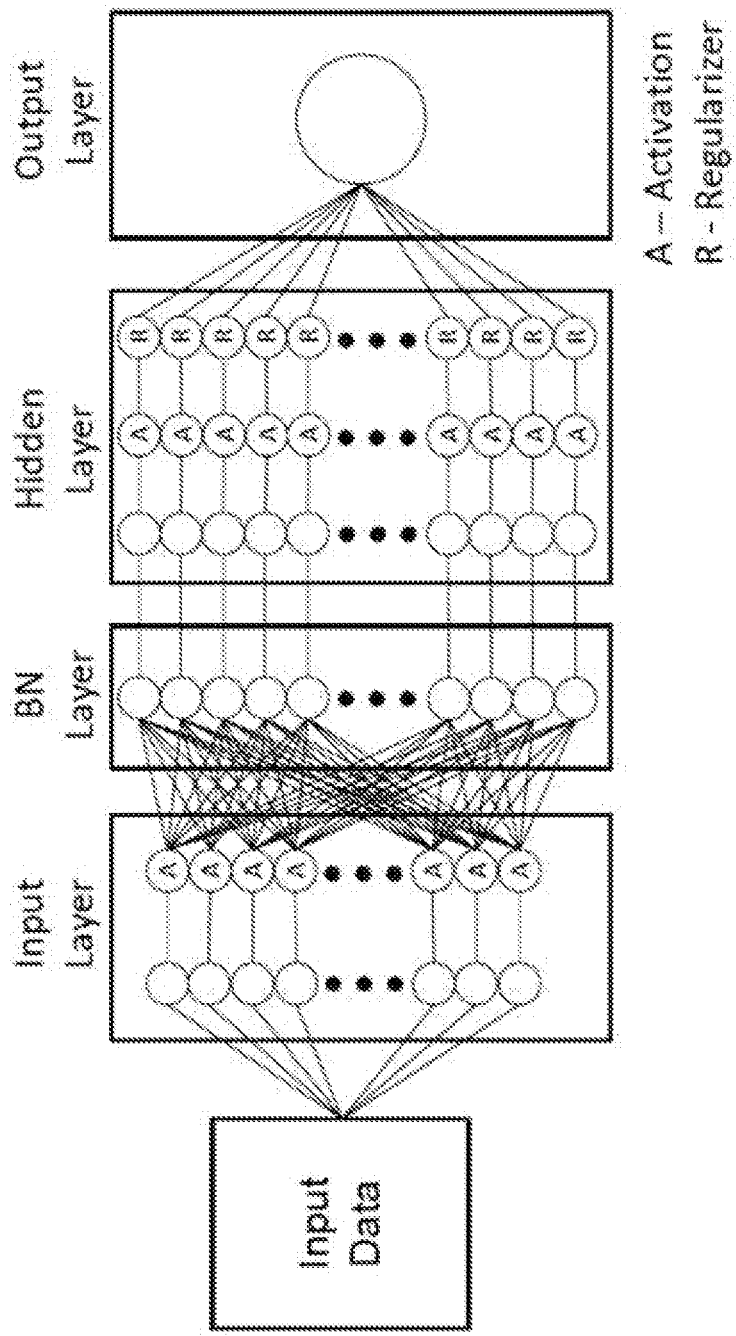
FIG. 6 may be an illustration of a deep learning algorithm.

Turning briefly to FIG. 6, a representative deep learning algorithm may be illustrated. The algorithm may have input layers and hidden layers. During training, weights of the hidden layer nodes may be adjusted so that for a given input, even a highly complex input with variations in values, an expected output is given. A characteristic of the deep learning algorithm is that it is very fast and produces an output virtually immediately upon an input change that may be helpful in the case of the predictive nature of the output in order to avoid reaching an undesirable service level of system performance. In contrast, a simple algorithm that monitors actual performance in terms of miss rates will necessarily have some undershoot or overshoot of performance due to the lag time between recognizing a performance issue and being able to correct for it.

Figure 7:
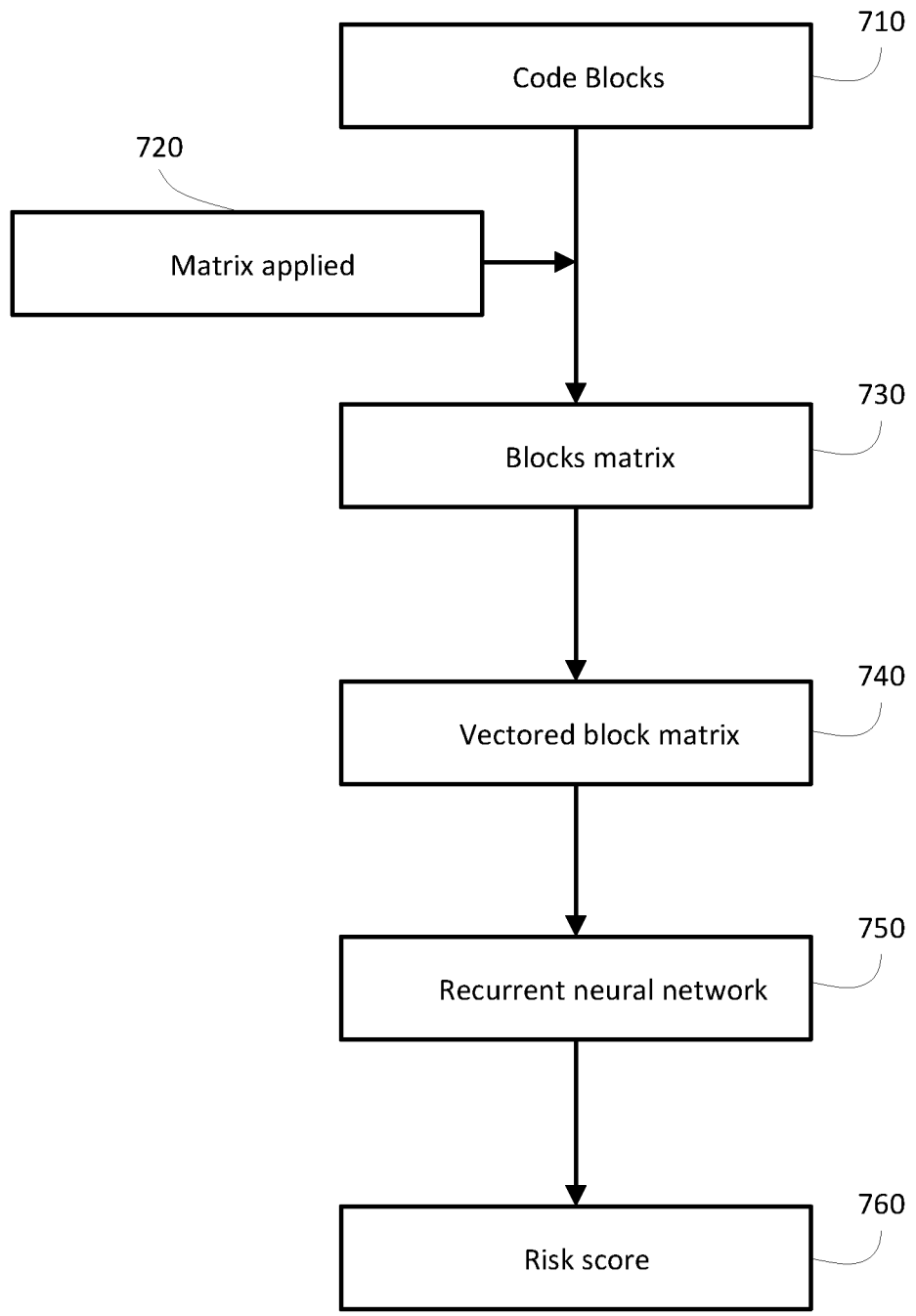
FIG. 7 may be an illustration of determining a risk score.

In one embodiment, as illustrated in FIG. 7, code may be processed line by line. Within each line, each word may be compare with reserved words database. If a reserved word is found, the run risk model may run through a deep learning algorithm as illustrated in FIG. 6 to determine a line risk score associated with the reserved word. If reserved word is not found, a normal natural language processing (NLP) may be executed at block 325.

From the rules engine 315, control may pass to a code checker 320 like pylin. Pylint may be a source-code, bug and quality checker for the Python programming language. It may check code to ensure the code follows a style such as the style recommended by PEP 8, the Python style guide. It may check the length of each line, check that variable names are well-formed according to the project's coding standard and checking that declared interfaces are truly implemented.

In addition, from the rules engine 315, control may pass to the natural language processing function 325. A sample natural language processing process may be illustrated in FIG. 7. As illustrated in FIG. 7, at a high level, the computer executable instructions may be processed line by line where the input may be blocks of code at block 710. At block 720, a matrix may be applied to the code blocks to get blocks matrix at block 730. At block 740, vectored blocks matrix may be created and may be placed into recurrent neural network at block 750 to get risk score of each block at block 760.

Figure 8:
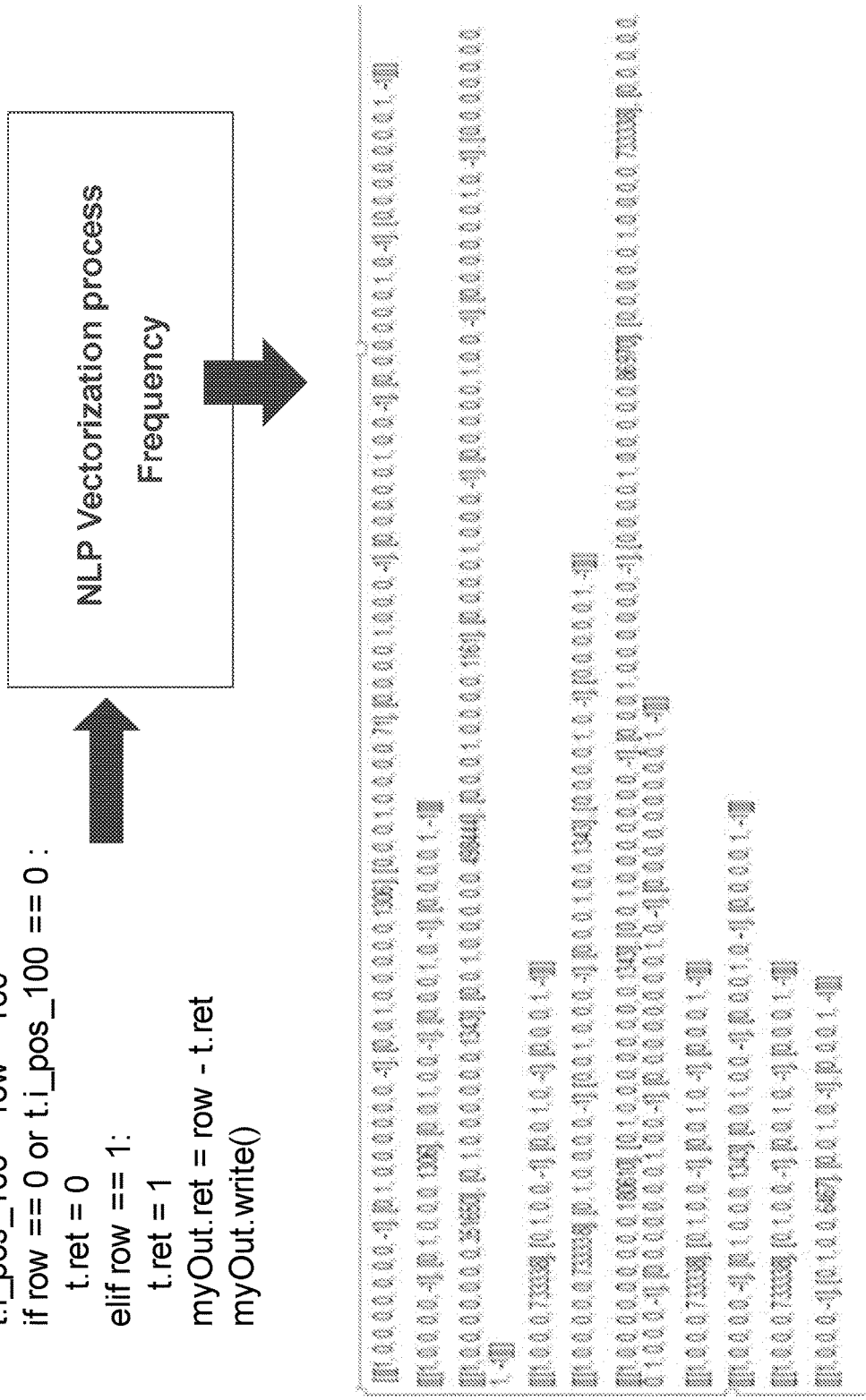
FIG. 8 may be an illustration of code vectorization results.

Sample vectorization may be illustrated in FIG. 8. In FIG. 8, a position of a given word (indicated by a 1/0) with the frequency of the work at the end position of the vector. Word frequency may be generated from historical data from previously approved computer executable instructions. The model may be built on prior code examples and cluster using N dimensions depending on sample size. The vectorized data may be scored using this model and suspect lines of code may be detected by looking at the renaming difference when summing the scores per dimension. A model may also be built using prior malicious code and the vector may be scored against this model as well.

| Code | Dimension | | | | difference |
|---|---|---|---|---|---|
| | 1 | 2 | ... | n | |
| myOut = data.output('stdout') | 0.022726 | 0.013831 | | 0.058984 | 0.05365776 |
| t = Data.Schema( ) | 0.02087 | 0.015953 | | 0.14225 | 0.06117976 |
| for row in range(4): | 0.023695 | 0.015998 | | 0.2200726 67419548] | 0.05572975 |
| t.ert = −99999 | 0.024318 | 0.022812 | | 0.217859 | 0.05541437 |
| t.i_pos_100 = row * 100 | 0.023236 | 0.021542 | | 0.141521 | 0.05338922 |
| if row == 0 or t.i_pos_100 == 0 : | 0.022726 | 0.019109 | | 0.054287 | 0.05365776 |
| t.ret = 0 | 0.022078 | 0.017545 | | 0.060773 | 0.09320569 |
| elif row == 1: | 0.016823 | 0.021007 | | 0.101679 | 0.14600018 |
| t.ret = 1 | 0.017916 | 0.015312 | | 0.099222 | 0.15311108 |
| myOut.ret = row - t.ret | 0.013937 | 0.023437 | | 0.09472 | 0.21669934 |
| myOut.write( ) | 0.015803 | 0.019109 | | 0.154067 | 0.14304748 |

Referring again to FIG. 3, at block 330, artificial intelligence may review the computer executable instructions. The artificial intelligence 330 may take into account computer executable instructions that have been review historically 332, reserved words 333 and risk factors 334. As mentioned previously, computer executable instructions that have been reviewed as part of historical computer executable instructions 332. Thus, the computer executable instructions may not need to be reviewed again.

Reserved words 333 may be words that carry additional risk and may require additional review. Some words may be known to be low risk and may require little analysis. As an example, a command to "print" may be low risk and may not require further analysis while the "get" commend could obtain data from a remote source which may be suspect and may require additional analysis. A database may store the reserve words. In some embodiments, the reserve words may be given a risk score and the risk score may be used be each entity to determine if the reserve word is safe or is risky. The acceptable level of risk may vary be user so the risk score for each reserve word may be used to customize the level of risk for each user.

Known risk factors 334 may be analyzed to determine if further analysis is needed. For example, if the computer executable instructions originate with a known problematic or risky source, the risk factors 334 would be high. Similarly, if the syntax of the computer executable instructions is recognized as being risky or sloppy, the known risk factor may be higher. Logically, the known risk factor may be given a rating and the rating may be used by the user to determine if the risk is acceptable.

The computer executable instructions may be communicated from the AI process to a reconstructed code module 335, a code cluster module 340 and a risk model 345.

The reconstructed code module 335 may take the sections of code that have been identified as being suspect and replace the suspect computer executable instructions with trusted computer executable instructions. As the name implies, the computer executable instructions may be reconstructed with computer executable instructions that have been previously approved or meet a standard code design. The module may be capable of replacing variable names with the names in the original computer executable instructions such that the computer executable instructions will continue to operate as intended. Similarly, decision functions may be modified in a way that the results of the decision should be the same but the computer executable instructions will be approved computer executable instructions.

The code cluster module 340 may evaluate the cluster of the computer executable instructions and determine if any of the computer executable instructions cluster are recognized. The clusters may be recognized in a positive way (cei is known and acceptable) or a negative way (cei needs to be replaced). By replacing entire clusters, the process may be more efficient that proceeding line by line or even word by word.

The reconstructed code module and the code cluster module may communicate to the integrator 355. The communication may follow a known protocol such that changes may be noted and understood. The integrator 355 may take the computer executable instructions from the code cluster module and the reconstructed code module and by noting the changes, may integrate the computer executable instructions into an integrated computer executable instructions set.

The risk module may 345 may determine a risk score. FIG. 7 may illustrate a sample manner of determining a risk score. The computer executable instructions may be converted into vectors using natural language processing as illustrated in FIG. 8. More specifically, the computer executable instructions may be vectorized into a matrix showing the position of a given word (indicated by a 1/0) with the frequency of the word at the end position of the vector. The word frequency may be generated from historical data from computer executable instructions that had been analyzed and cleared previously. Of course, other methods and systems may determine the risk score are possible and are contemplated.

At bock 350, the system and method may determine if the risk represented by the risk score is over a threshold. If the risk is determined to be over a threshold, the computer executable instructions submission may be rejected at block 360. If the risk of the computer executable instructions is under the threshold, the computer executable instructions may be passed to the integrator 355.

The integrator 355 may receive messages from the code checker 320, the reconstructed code unit 325 and the code cluster unit 340. The integrator 355 may determine where in the received computer executable instructions the code was changed.

The final reconstructed code may be created at block 365. If changes were suggested and made, the computer executable instructions with the changes may be reconstructed into the same format as the received computer executable instructions.

At block 370, the initial code and reconstructed code may be run using the same predefined test cases. The predefined test cases may be created in a way to test multiple aspects of the computer executable instructions in the hopes of finding any unintended changes. In some embodiments, the predefined test cases may be provided along with the computer executable instructions to be tested as the programmers may know best how to test the computer executable instructions.

At block 375, the system and method may determine if the output is the same between the original code and reconstructed code. The reconstructed code may have been changed but as can happen with computer executable instructions, there may be unintended consequences of reconstructing computer executable instructions. By comparing the output from the original code to the reconstructed code, the system and method may determine if there has been any unintended changes.

If the output is not the same, control may pass to block 360 and the computer executable instructions may be rejected.

If the output is the same, at block 380, the computer executable instructions may be pushed to production.

In some embodiments, the code may be transformed into a lower level code represented in XML or JSON. If the code is converted, then the converted code may be the one used in production and the original code may be used for validation. If validation fails, then the code review may be escalated, such as to a human. The security scan would be conducted on both code bases (converted and unconverted). For part of the code's risk assessment, the code may be treated as a text and processed using NLP to compare against prior code. In addition, the metadata of the code (like what lint generates) may also be compared to prior code submission and code outcome. Reserved words that have known bad outcomes may be heuristically added such as "drop table" with a suitably high enough score to trigger an alert.

Execution and performance statistics may also be used to see if the code is behaving as expected. These statistics may be features that do not fit well into prior unsupervised models but may be built from historical code metadata and performance metrics. An example may be a code which looks similar but whose performance metrics are much longer than prior similar models. This particular case may be heuristically added but then it would not be a general solution. Instead the system and method may build unsupervised models across all metrics then use a nearest neighbor approach to determine how well the code metric fit prior code.

The above described system and method may address numerous technical problems with technical solutions. Computer executable instructions are inherently technical and cause processors to be physically configured to do things according to the computer executable instructions. When the computer executable instructions are risky, large scale technical problems are possible and have occurred in the past. In response, by breakdown computer executable instructions into analyzable part, using past knowledge to compare the proposed code to past code, significant technical problems may be avoided by fixing the computer executable instructions before they spread.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of analyzing computer executable instructions for risk comprising:
   receiving computer executable instructions, wherein the computer executable instructions are yet to be executed;
   determining a proposed risk factor for the computer executable instructions, wherein the determining the proposed risk factor comprises:
      determining code level analyzable elements from the computer executable instructions, wherein the determining comprises reviewing a coding style of the computer executable instructions based on one or more of the following: comments in the computer executable instructions, libraries used by the computer executable instructions, indentation lines of codes of the computer executable instructions, uses of sub-routines of the computer executable instructions, existence of commands in the computer executable instructions, and lack of commands in the computer executable instructions;
      recursively separating recognizable sections of the code level analyzable elements from unrecognizable sections;
      executing a comparison of a first analyzable element to past analyzable elements stored in the memory that were previously deemed as one of the following: a known malicious code or a failure to align with a known good code, wherein the comparison compares the coding style to coding styles stored in the memory;
      based on the comparison, calculating a coding style similarity score as part of the proposed risk factor with a deep learning algorithm, wherein the deep learning algorithm comprises checking the coding style similarity score against a score associated with one or more of the past analyzable elements stored in the memory;
   determining a threshold for the proposed risk factor according to at least one of the following: a government authority with grades of thresholds, and a past history of the proposed risk factor of the computer executable instructions; and
   in response to the determined risk factor calculated for the first analyzable element being meeting the determined threshold, undertaking a risk response, wherein the risk response comprises one of the following:
   communicating a risk warning associated with the computer executable instructions, replacing the computer executable instructions identified as risk with a comparable computer executable instructions that have been determined to have an acceptable risk, or placing a hold on the computer executable instructions.

2. The method of claim 1, wherein the first analyzable element and the proposed risk factor for the first analyzable element are added to the memory.

3. The method of claim 1, further comprising:
   executing a comparison for additional code level analyzable elements in the computer executable instructions to past code level analyzable elements stored in the memory that were previously scored as the risk factors;
   based on the comparisons, calculating a total risk factor, wherein the total risk factor comprises the total of the risk factors for the additional code level analyzable elements; and
   in response to the total risk factor calculated for the additional code level analyzable elements being over the threshold, executing a risk response.

4. The method of claim 3, further comprising:
   analyzing libraries used by the computer executable instructions;
   determining a risk factor for the libraries;
   calculating an updated total risk factor wherein the updated total risk factor comprises a total of the risk factors for the additional code level analyzable elements and the risk factor determined for the libraries; and
   in response to the updated total risk factor being over the threshold, executing the risk response.

5. The method of claim 1, wherein determining code level analyzable elements from the computer executable instructions comprises:
   in response to the coding similarity score being over the threshold, classifying the computer executable instructions.

6. The method of claim 5, wherein classifying the computer executable instructions comprises:
   comparing the computer executable instructions to previously classified computer executable instructions;
   determining a similarity value between the computer executable instructions and previously classified computer executable instructions;
   ranking the similarity values;
   in response to the similarity value for the previously classified computer executable instructions being over the threshold, classifying the computer executable instructions as the previously classified computer executable instructions.

7. The method of claim 1, further comprising:
   determining deviations in the computer executable instructions from model computer executable instructions;
   communicating the deviations to a user;
   allowing the user to select to modify the deviations to follow the model computer executable instructions; and
   modifying the deviations in the computer executable instructions to follow the model computer executable instructions.

8. The method of claim 1, further comprising:
   determining deviations in the computer executable instructions from model computer executable instructions;
   in response to the deviation being determined to be a threat;
   communicating the deviations to a supervisor;
   allowing the supervisor to select to modify the deviations to follow the model computer executable instructions; and
   modifying the deviations in the computer executable instructions to follow the model computer executable instructions.

9. A computer system comprising an input output circuit, a memory and a processor physically configured according to computer executable instructions, the computer executable instructions comprising instructions for:
   receiving computer executable instructions, wherein the computer executable instructions are yet to be executed;

determining a risk factor for the computer executable instructions, wherein the determining the risk factor comprises:
determining code level analyzable elements from the computer executable instructions, wherein the determining comprises reviewing a coding style of the computer executable instructions based on one or more of the following: comments in the computer executable instructions, libraries used by the computer executable instructions, indentation lines of codes of the computer executable instructions, uses of sub-routines of the computer executable instructions, existence of commands in the computer executable instructions, and lack of commands in the computer executable instructions;
recursively separating recognizable sections of the code level analyzable elements from unrecognizable sections;
executing a comparison of a first analyzable element to past analyzable elements stored in the memory that were previously deemed as one of the following: a known malicious code or a failure to align with a known good code, wherein the comparison compares the coding style to coding styles stored in the memory;
based on the comparison, calculating a coding style similarity score as part of the proposed risk factor with a deep learning algorithm wherein the deep learning algorithm comprises checking the coding style similarity score against a score associated with one or more of the past analyzable elements stored in the memory;
determining a threshold for the risk factor according to at least one of the following: a government authority with grades of thresholds, and a past history of the risk factor of the computer executable instructions; and
in response to the determined risk factor calculated for the first analyzable element being meeting the determined threshold, undertaking a risk response, wherein the risk response comprises one of the following:
communicating a risk warning associated with the computer executable instructions, replacing the computer executable instructions identified as risk with a comparable computer executable instructions that have been determined to have an acceptable risk, or placing a hold on the computer executable instructions.

10. The computer system of claim 9, wherein the first analyzable element and the risk factor for the first analyzable element are added to the memory.

11. The computer system of claim 9, further comprising computer executable instructions for:
executing a comparison for additional code level analyzable elements in the computer executable instructions to past code level analyzable elements stored in the memory previously scored as risk factors;
based on the comparisons, calculating a total risk factor wherein the total risk factor comprises the total of the risk factors for the additional code level analyzable elements;
in response to the total risk factor calculated for the additional code level analyzable elements being over the threshold, undertaking the risk response.

12. The computer system of claim 9, further comprising computer executable instructions for:
analyzing libraries used by the computer executable instructions;
determining a risk factor for the libraries;
calculating an updated total risk factor wherein the updated total risk factor comprises a total of the risk factors for the additional code level analyzable elements and the risk factor determined for the libraries; and
in response to the updated total risk factor being over the threshold, executing the risk response.

13. The computer system of claim 9, wherein determining code level analyzable elements from the computer executable instructions comprises computer executable instructions for:
in response to the coding similarity score being over the threshold, classifying the computer executable instructions.

14. The computer system of claim 9, wherein classifying the computer executable instructions comprises computer executable instructions for:
comparing the computer executable instructions to previously classified computer executable instructions;
determining a similarity value between the computer executable instructions and previously classified computer executable instructions;
ranking the similarity values;
in response to the similarity value for the previously classified computer executable instructions being over the threshold, classifying the computer executable instructions as the previously classified computer executable instructions.

15. The computer system of claim 9, further comprising computer executable instructions for:
determining deviations in the computer executable instructions from model computer executable instructions;
communicating the deviations to a user;
allowing the user to select to modify the deviations to follow the model computer executable instructions; and
modifying the deviations in the computer executable instructions to follow the model computer executable instructions.

16. The computer system of claim 9, further comprising computer executable instructions for:
determining deviations in the computer executable instructions from model computer executable instructions;
in response to the deviation being determined to be a threat;
communicating the deviations to a supervisor;
allowing the supervisor to select to modify the deviations to follow the model computer executable instructions; and
modifying the deviations in the computer executable instructions to follow the model computer executable instructions.

17. A tangible non-transitory computer readable medium comprising computer executable instructions for:
receiving computer executable instructions, wherein the computer executable instructions are yet to be executed; determining a risk factor for the computer executable instructions, wherein the determining the risk factor comprises:
determining code level analyzable elements from the computer executable instructions, wherein the determining comprises reviewing a coding style of the computer executable instructions based on one or more of the following: comments in the computer executable instructions, libraries used by the computer executable instructions, indentation lines of codes of the computer executable instructions, uses of sub-routines of the computer executable instructions, existence of commands in the computer executable instructions, and lack of commands in the computer executable instructions;

recursively separating recognizable sections of the code level analyzable elements from unrecognizable sections;

executing a comparison of a first analyzable element to past analyzable elements stored in the memory that were previously deemed as one of the following: a known malicious code or a failure to align with a known good code, wherein the comparison compares the coding style to coding styles stored in the memory;

based on the comparison, calculating a coding style similarity score with a deep learning algorithm as part of the proposed risk factor wherein the deep learning algorithm comprises checking the coding style similarity score against a score associated with one or more of the past analyzable elements stored in the memory;

determining a threshold for the risk factor according to at least one of the following: a government authority with grades of thresholds, and a past history of the risk factor of the computer executable instructions; and in response to the determined risk factor calculated for the first analyzable element being meeting the determined threshold, undertaking a risk response, wherein the risk response comprises one of the following:

communicating a risk warning associated with the computer executable instructions, replacing the computer executable instructions identified as risk with a comparable computer executable instructions that have been determined to have an acceptable risk, or placing a hold on the computer executable instructions.

18. The tangible non-transitory computer readable medium of claim 17, further comprising computer executable instructions for:

executing a comparison for additional code level analyzable elements in the computer executable instructions to past code level analyzable elements stored in a memory previously scored as risk factors;

based on the comparisons, calculating a total risk factor wherein the total risk factor comprises the total of the risk factors for the additional code level analyzable elements;

in response to the total risk factor calculated for the additional code level analyzable elements being over the threshold, executing the risk response.

19. The tangible non-transitory computer readable medium of claim 18, further comprising computer executable instructions for:

analyzing libraries used by the computer executable instructions;

determining a risk factor for the libraries;

calculating an updated total risk factor wherein the updated total risk factor comprises a total of the risk factors for the additional code level analyzable elements and the risk factor determined for the libraries;

in response to the updated total risk factor being over the threshold, executing the risk response.

20. The tangible non-transitory computer readable medium of claim 17, wherein determining code level analyzable elements from the computer executable instructions further comprises:

in response to the coding similarity score being over the threshold, classifying the computer executable instructions.

* * * * *